R. O. Lowrey,
Bed Bottom.
No. 3463. Reissued May 25, 1869.
Fig. 5.
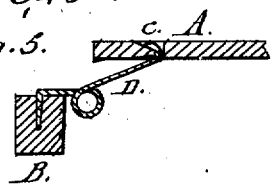
Fig. 2.
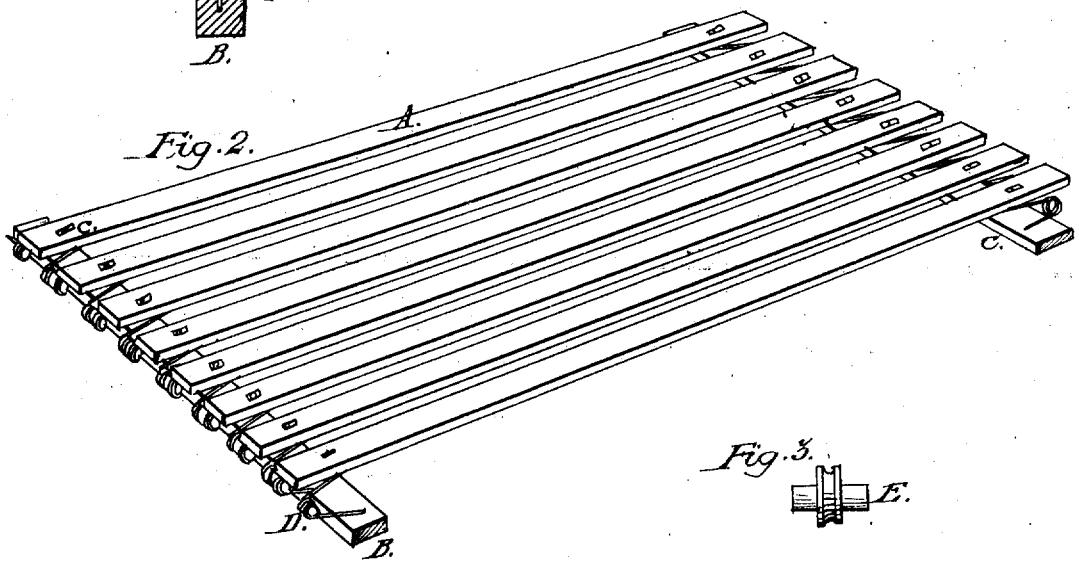
Fig. 3.
Fig. 1.
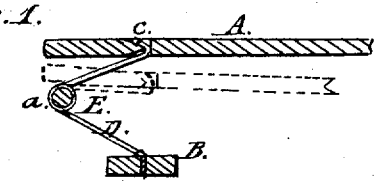
Fig. 4.
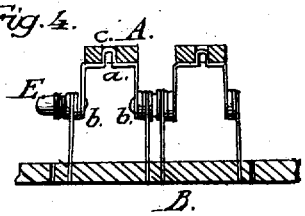
Witnesses:
L. Hailey
P. F. Dodge
Inventor:
R. O. Lowrey
by Dodge & Munn
Atty
N. PETERS, PHOTO-LITHOGRAPHER, WASHINGTON, D. C.

United States Patent Office.

ROBERT O. LOWREY, OF SALEM, NEW YORK.

*Letters Patent No.* 87,948, *dated March* 16, 1869; *reissue No.* 3,463, *dated May* 25, 1869.

IMPROVED BED-BOTTOM.

The Schedule referred to in these Letters Patent and making part of the same.

*To all whom it may concern:*

Be it known that I, ROBERT O. LOWREY, of Salem, in the county of Washington, and State of New York, have invented certain new and useful Improvements in Spring-Bed Bottoms; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to make and use my invention, I will proceed to describe it.

My invention relates to spring-bed bottoms, and consists in certain new and useful improvements in the bed-bottom for which Letters Patent No. 74,388 were granted me, February 11, 1868.

By means of these improvements, I am able to produce a better construction and arrangement of the springs and slats, and to make a more elastic, durable, and cheap spring-bed bottom.

In the drawings—

Figure 1 is a sectional view of a part detached, showing the springs and the mode of connecting them with cross-pieces and slats.

Figure 2 is a perspective view.

Figure 3 is a view of a part detached.

Figure 4 is an end view of a part detached, and partly in section.

Figure 5, a view of a modification of the spring.

I construct my bed-bottom of a series of longitudinal slats, A, which I connect with two flat cross-pieces B and C, by wire springs D, arranged as clearly shown in fig. 2.

Each of the slats A, I provide with two springs D, one at each end.

These springs D, I make of any kind of wire having suitable elasticity and strength, and form them as clearly shown in figs. 1 and 4, or in the modified form shown in fig. 5.

Each of these springs I make of a single piece of wire, bending the central portion as shown in fig. 4, so as to form a hook, *a*, and the legs or sides, so as to form coils *b*, and the ends, so that they may be conveniently attached to the cross-pieces B and C, as shown in figs. 1, 2, and 4.

Near each end of these slats A, I cut a hole, *c*, which may be square or oblong, and of proper size to permit the hook *a* of the spring to be inserted therein, as represented in fig. 1.

The edge of the bar on that side of the hole nearest the end of the slats is cut away, or bevelled from each side toward the centre of the slat, as shown more clearly in fig. 5, thus forming a recess, in which the point of the hook *a* rests, so as not to be thrown above the surface of the slat, and which also permits the slat, when bent or sagged by use, to be turned over and used, with equal facility, the other side up.

This shaped opening makes a better bearing for the hooks *a*, allows an easier and freer motion of the slats and springs, and, by letting the hooks *a* rest a little below the surface of the slats, they do not rub against and wear holes in the ticking of the bed.

The springs D, I so arrange on the cross-bars B and C, and connect them with the slats A, that when in their natural position, their hooks *a* will be a little in the rear of the vertical plane passing through their points of connection with the cross-bars.

Between these coils *b*, I insert blocks E, with their ends entering in the coils. These blocks E are formed and shaped as shown in fig. 3, and arranged as shown in figs. 2 and 4.

They serve to connect and hold the springs D in position, without interfering with their moving independently of each other.

The legs or sides of the springs D are set far enough apart to permit the ends of the slats A, to which they are attached, to pass between them, when pressed down, as shown in red lines, in fig. 1.

It is obvious that these springs D may be modified in form, and connected with the cross-bars and slats, as shown in fig. 5, but I prefer to make and arrange them as in figs. 1, 2, and 4.

In this way, I am able to make a complete bed-bottom, as shown in fig. 2, which can be readily and conveniently inserted within the frame of a bedstead.

It is simple, compact, and durable. Each slat moves independently of the other, and in event of either of the slats being bent or sprung, it can be easily turned over, or if broken, can be conveniently removed, and another put in its place.

In my former patent, mentioned above, the springs at the head are stiffer than those at the foot. This peculiarity I preserve in my present construction, which also embraces the peculiar manner of constructing, arranging, and connecting the elbow-springs, as well as in providing the slats with wedge-shaped openings, and the springs with connecting and supporting blocks.

Having thus described my invention,

What I claim as new, and desire to secure, is—

1. The slats A, having the holes *c*, with recesses for the points of the hooks to rest in, substantially as shown and described.

2. Connecting the adjoining springs of the series by means of the blocks E, constructed and applied as shown and described.

3. An elbow-spring, constructed substantially as herein described, with a hook on its upper or free end, for loose attachment to an opening in a slat, in the same vertical plane, or nearly so, with its attachment below, and with a shoulder formed on each side of the hook for the slat to bear upon, as set forth.

4. The combination of the slats A with the elbow-springs D and cross-bar B, when constructed and arranged substantially as described and for the purpose set forth.

R. O. LOWREY.

Witnesses:
H. B. MUNN,
P. T. DODGE.